No. 695,484. Patented Mar. 18, 1902.
R. R. PARKER.
MEANS FOR GROWING AND TRANSPLANTING PLANTS.
(Application filed June 14, 1901.)
(No Model.)

WITNESSES:

INVENTOR
R. R. Parker
BY
ATTORNEYS

UNITED STATES PATENT OFFICE.

ROBERT REESE PARKER, OF RAWLINGS, MARYLAND.

MEANS FOR GROWING AND TRANSPLANTING PLANTS.

SPECIFICATION forming part of Letters Patent No. 695,484, dated March 18, 1902.

Application filed June 14, 1901. Serial No. 64,500. (No model.)

*To all whom it may concern:*

Be it known that I, ROBERT REESE PARKER, a citizen of the United States, and a resident of Rawlings, county of Allegany, and State of Maryland, have invented certain new and useful Improvements in Means for Growing and Transplanting Plants, of which the following is a specification, reference being had to the accompanying drawings, forming a part thereof, in which similar characters of reference indicate corresponding parts.

This invention relates to a process of and means for growing and transplanting plants, the object being to provide a plant-holder which may be placed in the ground or in a bed and have the earth or soil filled in therearound and within the holder, so as to form a continuous planting surface or bed on which seed may be scattered and which holder may be removed from the ground or bed with one or more plants firmly rooted therein without disturbing other plants growing adjacent thereto.

In practice I prefer to make use of a plurality of similar plant-holders of skeleton construction, which may be placed in the ground or in a bed in regular rows close together and the soil filled in all around and within the skeleton holders in such a manner as to form a continuous solid planting surface or bed, after which the seed will be sown by scattering it irregularly over the whole surface of the soil. As soon as the seeds germinate and the plants spring up they may be thinned out and one or more left in the place occupied by each skeleton plant-holder or basket, and it will be evident that when the planting and the thinning out are performed in the manner described a single plant may be left in the center of each holder, with a solid section of earth or soil appropriated thereto, thus assuring the proper growth of the plant without disturbing the soil in which its growth began. Hence each plant-holder with its individual plant or plants may be removed from the bed and transplanted, with the soil in which its growth began attached thereto and undisturbed in position, this being a very important matter in transplanting.

Figure 1:
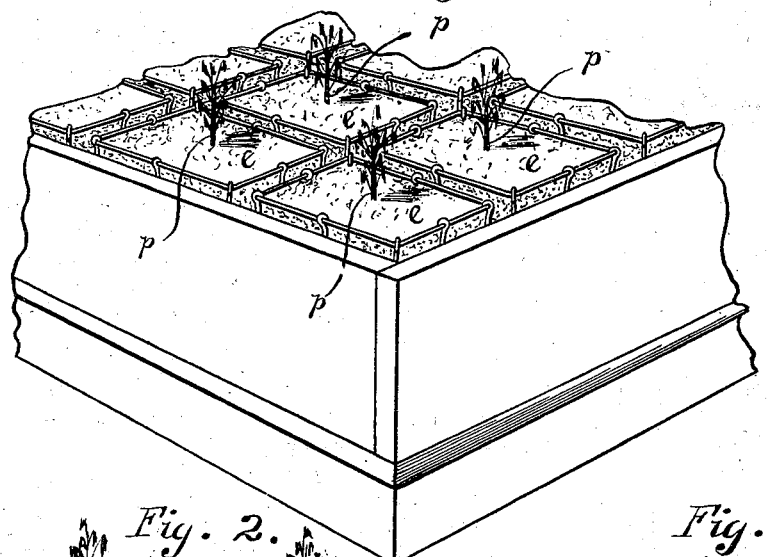
Figure 2:
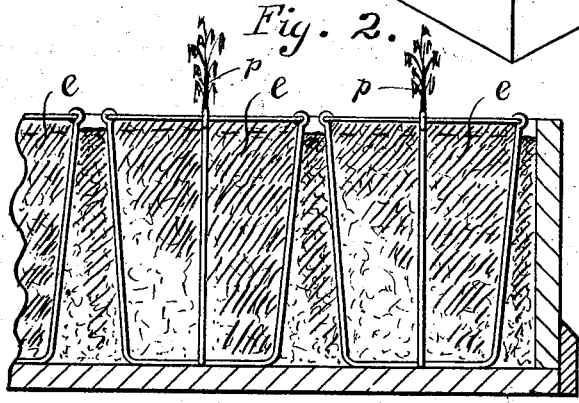
Figure 3:
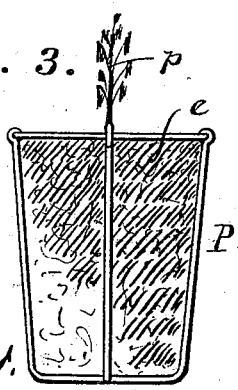
Figure 4:
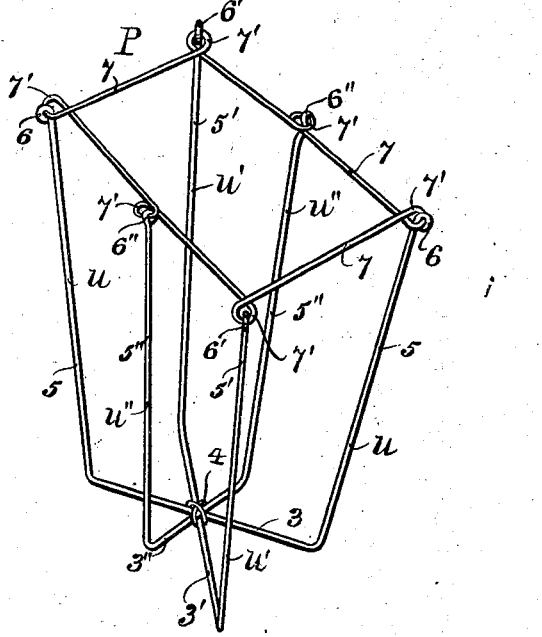

In the drawings, Figure 1 is a perspective view of a portion of a bed having therein a plurality of rows of plant-holders constructed in accordance with my invention. Fig. 2 is a vertical longitudinal section of a portion of such bed. Fig. 3 is a side elevation of a plant-holder with a section of soil inclosed thereby and a central plant growing in such soil. Fig. 4 is an enlarged perspective view of my improved plant-holder.

My improved plant-holder or basket, which may be of any suitable skeleton construction, is designated herein by P, and preferably is a skeleton frame or receptacle made up of several connected U-shaped frames combined and spaced to form substantially a basket. Many different forms of skeleton plant-holders may be employed without departing from the invention; but I have found that a basket suitable for the purpose may be formed from three U-shaped wire frames, two of which may be relatively wide and the other somewhat narrower, but all of which will cross each other and be connected or tied together, preferably at the center of the bottom of each U-shaped frame.

The two principal U-shaped members of the plant-holder are indicated herein by $u$ and $u'$, respectively, and the narrow U-shaped member by $u''$. These three U-shaped members or frame-pieces are preferably so placed that the base portions 3 and 3' of the members $u$ and $u'$ cross diagonally to form a bottom substantially X-shaped, while the base portion 3'' of the frame $u''$ crosses such X-shaped base transversely at the point of intersection of the wires 3 and 3', and thus forms a basket bottom for the plant-holder that will present six points or arms of support for the soil to be contained within the plant-holder. At the point of intersection of the wires 3, 3', and 3'' these may be held together in any desired manner, so as to form a substantially rigid skeleton bottom; but I prefer to tie them together by means of a wire 4, wrapped back and forth between the angles of intersection of the bottom wires.

Each of the side arms of the U-shaped frame-pieces may have its upper end bent over to form an eye, the eyes of the side arms 5 of the frame-piece $u$ being designated by 6, those of the side arms 5' of the frame-piece $u'$ by 6', and those of the side arms 5'' of the narrow U-shaped frame $u''$ by 6''. Through these eyes a single piece of wire may be passed to form the ring or basket top of the skeleton plant-holder or basket P. I prefer to shape this wire 7 in such a manner as to form a rectangular or oblong frame, and in order to maintain the upper ends of the U-shaped frames in their proper positions eyes 7' may be formed in the wire 7 at the corners of the rectangular frame and also at the centers of the long sides thereof, these eyes 7' interlocking with the eyes 6, 6', and 6'', and thus forming a strong and substantially rigid basket or skeleton plant-holder.

It will be obvious that my improved skeleton plant-holder may be constructed in many other ways, but in every case it will have a skeleton frame with a basket top or ring and a basket bottom capable of sustaining the body of earth or soil intended to be contained therein. Moreover, this plant-holder will preferably taper toward the bottom thereof in order to facilitate the removal of the same from the surrounding soil in which it is embedded, and in the construction shown each of the U-shaped frames $u$, $u'$, and $u''$ is considerably wider at the top than at the bottom thereof.

In using my improved plant-holder I arrange a plurality of plant-holders P in regular rows in two directions and fill in earth or soil all around and within the plant-holders and pack the soil in place, except, of course, the top layer. The frames of the plant-holders present but little obstruction to the earth as the latter is shoveled into place, because of the fact that the holder is made up of a small number of light frame-pieces of wire separated by very wide spaces. When the bed is finished, it will be apparent that the plant-holders will be firmly embedded in the soil, after which the seed may be scattered irregularly over the whole surface of the bed. After the plants have attained a proper growth they may be thinned out in the usual manner, and preferably only one plant, such as $p$, will be left in the center of each basket. By furrowing the surface of the bed between the rows of plant-holders each holder, with its contained body of earth $e$, may be separated from the remainder of the bed, whereupon the holder may be removed from the bed without disturbing the plant therein by simply lifting the basket, the sloping sides of the latter facilitating the removal thereof.

My improved plant-holder constitutes a very simple and effective device for controlling the growth of plants and permits the transplanting of individual plants without injury thereto and without disturbing the soil around the roots thereof.

Having thus described my invention, what I claim as new, and desire to secure by Letters Patent, is—

1. In a plant-holder the combination with three U-shaped frame-pieces, two of which cross diagonally and the other of which crosses transversely to the first two and all of which are connected at the center of the bottom of each to form a basket bottom, of a substantially oblong frame connected at its corners and at the centers of its long sides to the upper ends of the side arms of said U-shaped frame-pieces.

2. The combination with the U-shaped frame-pieces $u$, $u'$ and $u''$, connected at their middle parts so as to form six supporting-arms as specified; and the eyes 6, 6' and 6'', formed upon the ends of said frame-pieces; of the wire 7, formed with the eyes 7', connected to the said frame-pieces by the said eyes 7', engaging the eyes 6, 6' and 6'', and holding the upper ends of said frame-pieces in proper position, all substantially as and for the purpose set forth.

In testimony that I claim the foregoing as my invention I have signed my name, in presence of two witnesses, this 6th day of June, A. D. 1901.

ROBERT REESE PARKER.

Witnesses:
J. M. HELMAN,
B. L. MORELAND.